United States Patent
Liang et al.

(10) Patent No.: US 7,446,820 B2
(45) Date of Patent: Nov. 4, 2008

(54) METHODS AND APPARATUS FOR RE-SCALING IMAGE BY VARIABLE RE-SCALING FACTOR USING B-SPLINE INTERPOLATOR

(75) Inventors: Kuo-Ching Liang, New York, NY (US); Raju Hormis, New York, NY (US); Sreenath Kurupati, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 597 days.

(21) Appl. No.: 11/093,683

(22) Filed: Mar. 30, 2005

(65) Prior Publication Data

US 2006/0221245 A1 Oct. 5, 2006

(51) Int. Cl.
*H04N 7/01* (2006.01)
*H04N 11/20* (2006.01)
*H04N 9/74* (2006.01)
*G06K 9/32* (2006.01)
*G09G 5/00* (2006.01)

(52) U.S. Cl. ............ 348/581; 348/441; 382/298; 382/299; 345/660

(58) Field of Classification Search ............ 348/441, 348/581; 382/298, 299; 345/660
See application file for complete search history.

(56) References Cited

U.S. PATENT DOCUMENTS

| | | | | |
|---|---|---|---|---|
| 5,604,824 A | * | 2/1997 | Chui et al. | 382/248 |
| 5,936,628 A | * | 8/1999 | Kitamura et al. | 345/420 |
| 6,424,749 B1 | * | 7/2002 | Zhu et al. | 382/260 |
| 6,573,940 B1 | * | 6/2003 | Yang | 348/441 |
| 6,687,422 B1 | * | 2/2004 | Chen et al. | 382/300 |
| 7,061,409 B1 | * | 6/2006 | Jantti et al. | 341/61 |
| 2004/0145501 A1 | * | 7/2004 | Hung | 341/61 |
| 2005/0134731 A1 | * | 6/2005 | Lee et al. | 348/458 |
| 2005/0196072 A1 | * | 9/2005 | Zhong | 382/298 |
| 2006/0039514 A1 | * | 2/2006 | Radakovic | 375/355 |
| 2006/0227152 A1 | * | 10/2006 | Berenguer et al. | 345/660 |
| 2007/0031065 A1 | * | 2/2007 | Sun | 382/299 |

OTHER PUBLICATIONS

S.R. Dooley, R.W. Steward and T.S. Durrani, "Fast on-line B-spline interpolation", Electronics Letters Jul. 8, 1999, vol. 35, No. 14, pp. 1130-1131.

* cited by examiner

*Primary Examiner*—Brian P Yenke
(74) *Attorney, Agent, or Firm*—Buckley, Maschoff & Talwalkar LLC (57) ABSTRACT

A method includes receiving a sequence of input samples that represents a row of pixels in an image. The method further includes selecting a re-scaling factor for at least a portion of the row of pixels. The method further includes determining a phase offset based on the selected re-scaling factor, and applying a direct B-spline transform to a group of the samples to generate transform coefficients. The method further includes providing the transform coefficients as an input to a filter bank, and applying the phase offset at an output of the filter bank to generate a sequence of output samples.

19 Claims, 11 Drawing Sheets

METHODS AND APPARATUS FOR RE-SCALING IMAGE BY VARIABLE RE-SCALING FACTOR USING B-SPLINE INTERPOLATOR

BACKGROUND

It is a desirable feature of video signal processing integrated circuits (ICs) to have the capability of re-scaling (re-sizing) an input video image such that the video signal output from the video signal processing IC has different dimensions (measured in pixels) from the input video signal. Video image resizing may be useful for applications such as conversion between standard definition and high definition formats, aspect ratio correction, picture-in-picture displays, chroma interpolation, or conversion between so-called "letter-box" and full-screen formats. The latter application may call for anamorphic re-scaling, in which the resizing factor may vary from one picture dimension to the other and/or from one region of the image plane to another.

DETAILED DESCRIPTION

Figure 1:
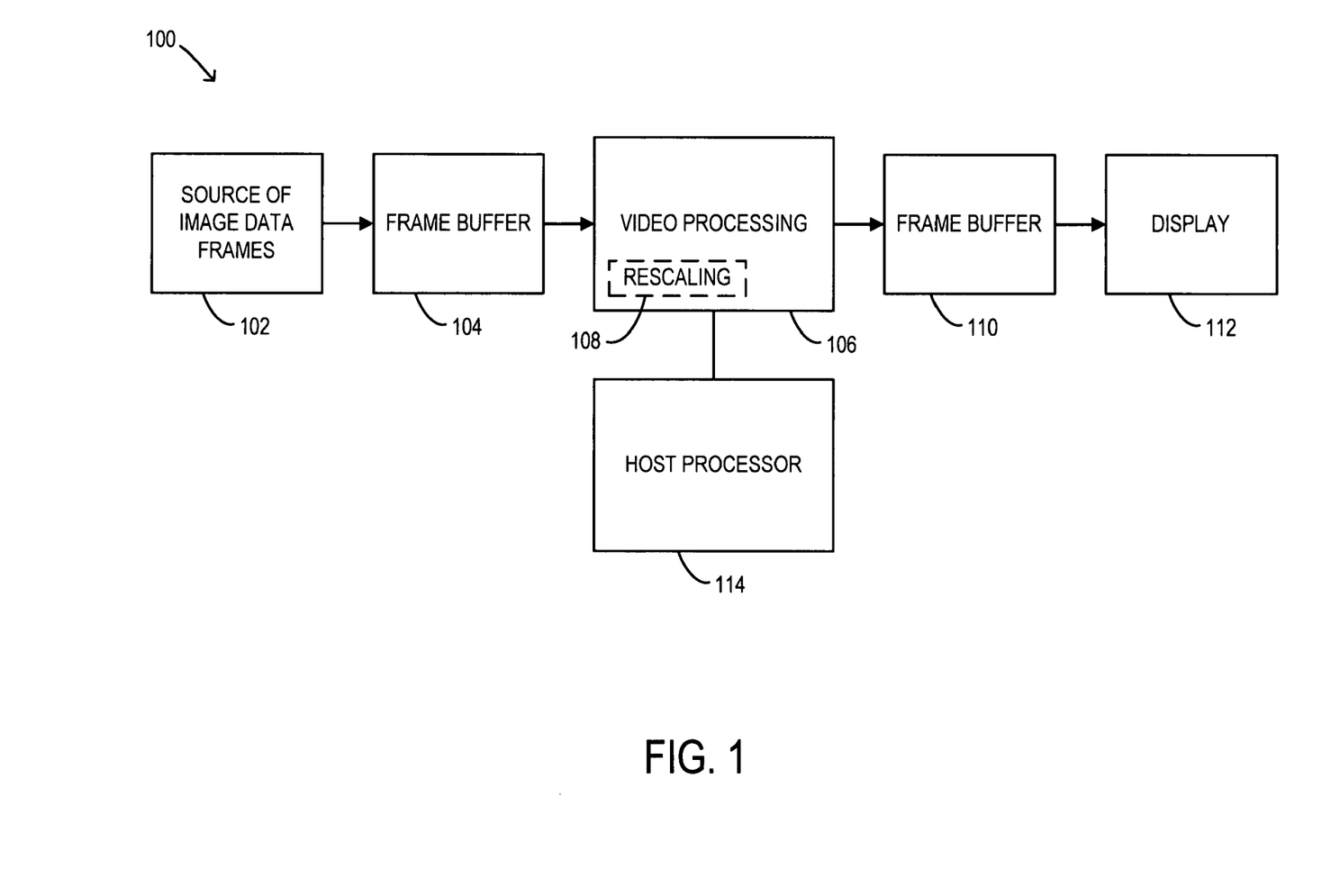
FIG. 1 is a block diagram of a system provided according to some embodiments.

FIG. 1 is a block diagram of a system 100 for displaying video signals. The system 100 may include a source 102 of image data frames. The image data source 102 may, for example, include one or more of a television tuner, a DVD drive, a computer hard drive, a network interface, a cable television set-top box, a digital video tape recorder, a personal video recorder, etc. The system 100 may also include an input frame buffer 104 coupled to the image data source 102 to store one or more image data frames provided by the image data source 102.

The system 100 may further include a video processing device 106 (e.g., an IC) that is coupled to the input frame buffer. The video processing device 106 may perform various types of processes with respect to the input image signal, such as re-scaling by a re-scaling circuit indicated at 108.

In addition, the system 100 may include an output frame buffer 110 coupled to the video processing device 106 to store processed (e.g., re-sized) image data frames output from the video processing device 106. The frame buffers 104, 110 may be combined together in the same memory device or may be constituted by separate memory devices. Whether combined or separate, the frame buffers 104, 110 may collectively be referred to as a graphics memory unit.

Still further, the system 100 may include a display device 112 (CRT, flat panel display, liquid crystal display, etc.) coupled to the output frame buffer 110 to display image signals provided from the output frame buffer 110.

The system 100 may also include a host processor 114 coupled to the video processing device 106. The host processor 114 may be a general purpose microprocessor, microcontroller or the like, and may control the video processing device 106 and/or other aspects of the system 100.

Figure 2:
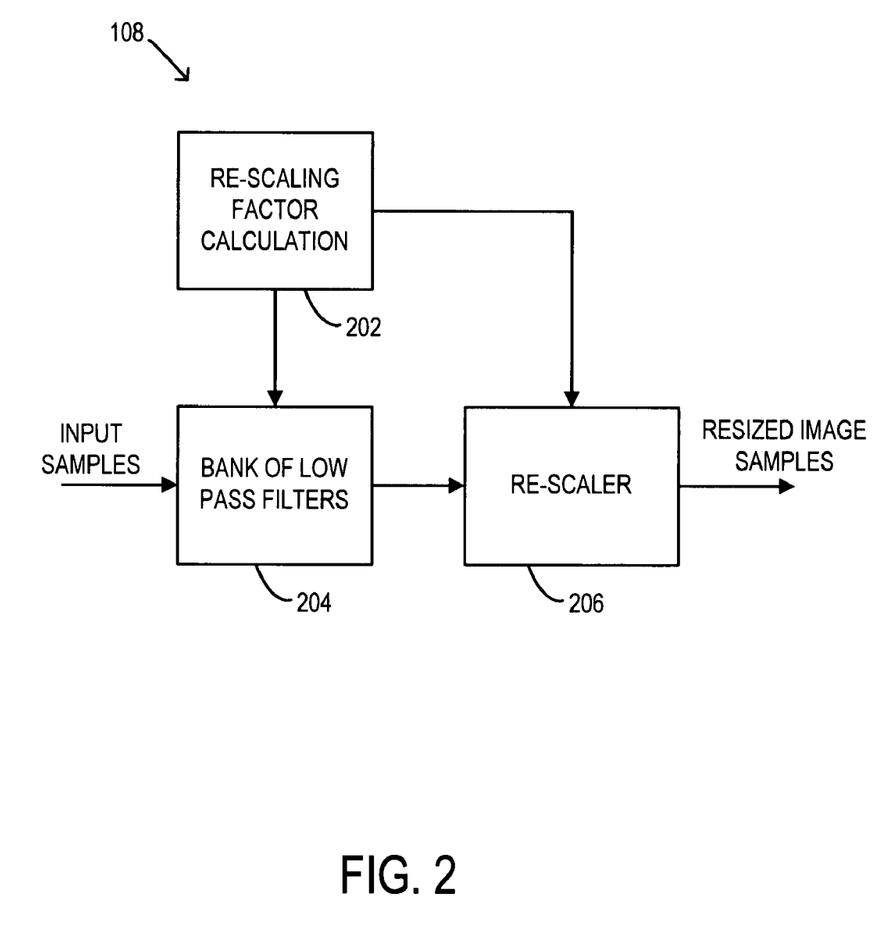
FIG. 2 illustrates in block diagram form an image re-scaling circuit that is part of a video processing IC included in the system of FIG. 1.

FIG. 2 is a block diagram which shows aspects of the image re-scaling circuit 108 of the video processing device. The image re-scaling circuit 108, and other embodiments of the image re-scaling circuit described hereinafter may be operable to re-scale images in accordance with a wide range of re-scaling factors, both greater than one (for upscaling) and less than one (for downscaling). In some embodiments, the re-scaling factor to be used may be arbitrarily selected according to the needs of the image re-sizing application to be performed by the image re-scaling circuit. Moreover, image re-scaling circuits described hereinafter may be operable to perform anamorphic re-scaling, including re-scaling factors that change along a horizontal line (row) or column of pixels. The re-scaling factors may change on a pixel by pixel basis along the row or column.

The re-scaling circuitry illustrated in FIG. 2 may operate as a one-dimensional re-scaler, which first may be applied to rows of image pixels and thereafter to columns of the horizontally re-sized image to produce an image that has been re-sized in both dimensions. (Alternatively, the one-dimensional re-scaler may first be applied vertically and thereafter horizontally.)

One approach to one-dimensional resizing may involve obtaining an approximation of a continuous function that is represented by a sequence of pixel values and then resampling the continuous function (or an approximation thereof) to increase or decrease the number of samples per fixed time interval. Such an approach is approximated by the re-scaling circuitry of FIG. 2.

The image re-scaling circuit 108 shown in FIG. 2 includes a re-scaling factor calculating block 202. The re-scaling factor calculating block 202 may calculate a re-scaling factor that varies depending on the current position along a row or column of pixels that is being processed by the circuit 108. In this way anamorphic re-scaling may be supported, with the re-scaling factor being selected by the block 202 as required. In other embodiments and/or for other applications, the block 202 may select a re-scaling factor that is constant along a row or column of pixels.

The image re-scaling circuit 108 further includes a bank 204 of low pass filters, one of which is selected by the block 202 to receive the sequence of input image data samples (input pixel values). The particular low-pass filter to be selected from the filter bank 204 may be selected on the basis of the currently selected re-scaling factor. In some embodiments, the filter bank 204 may be constituted by ten low pass filters respectively having cut-off frequencies of $0.9*\pi$, $(0.9)^2*\pi$, $(0.9)^3*\pi$, ..., $(0.9)^{10}*\pi$. A filter, selected as described below from the filter bank 204, may serve as an anti-aliasing filter to prevent aliasing that may otherwise occur if downsampling is to be performed downstream from the filter bank 204.

In addition, the image re-scaling circuit 108 includes a re-scaler block 206. The re-scaler block 206 is coupled downstream from the filter bank 204 to receive the low-pass-filtered sequence of samples output from the low pass filter of the bank 204 that was selected by the re-scaling factor calculating block 202.

Figure 3:
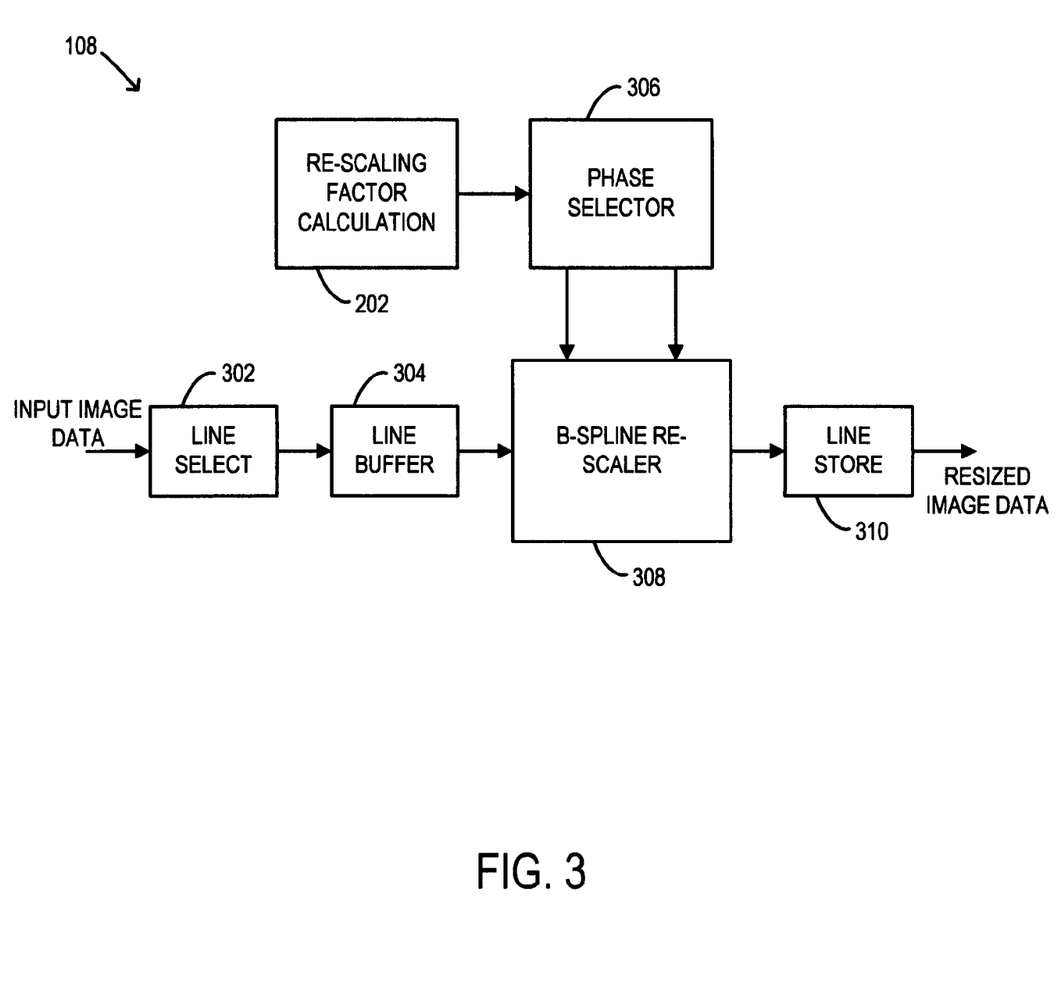
FIG. 3 is a block diagram that illustrates some details of the image re-scaling circuit of FIG. 2.

FIG. 3 is a block diagram that illustrates some details of the image re-scaling circuit 108.

The image re-scaling circuit 108 may include a line select circuit 302 to select the current line (or column, if vertical re-scaling is to be performed) of pixels to be re-scaled. The image re-scaling circuit 108 may also include a line buffer 304 to buffer the pixel data for the line of pixels selected by the line select circuit 302.

In addition, the image re-scaling circuit 108 may include a phase selector block 306 (also referred to as a phase offset determination block). The phase offset determination block 306 is coupled to the re-scaling factor calculating block 202 to receive the current re-scaling factor. On the basis of the current re-scaling factor, the phase offset determination block 306 determines the phase offset to be employed in obtaining the current output sample value, as described below.

The image re-scaling circuit 108 further includes an B-spline re-scaler 308 that is coupled to the phase offset determination block 306 and to the line buffer 304. The B-spline re-scaler 308 operates in a manner to be described below to perform one-dimensional re-scaling with respect to the line (or column) of pixel values stored in the line buffer 304.

The image re-scaling circuit 108 may also include a line store 310 to store the re-scaled output sequence that is produced by the B-spline re-scaler 308.

The bank of low-pass filters 204 (FIG. 2), which is omitted from FIG. 3, may be positioned between the line buffer 304 and the B-spline re-scaler 308. In a re-scaling circuit which performs only up-scaling, the low pass filters may be omitted. Similarly, at times when up-scaling is performed in a circuit with both up-scaling and down-scaling capabilities, the low pass filters may be by-passed.

Figure 4:
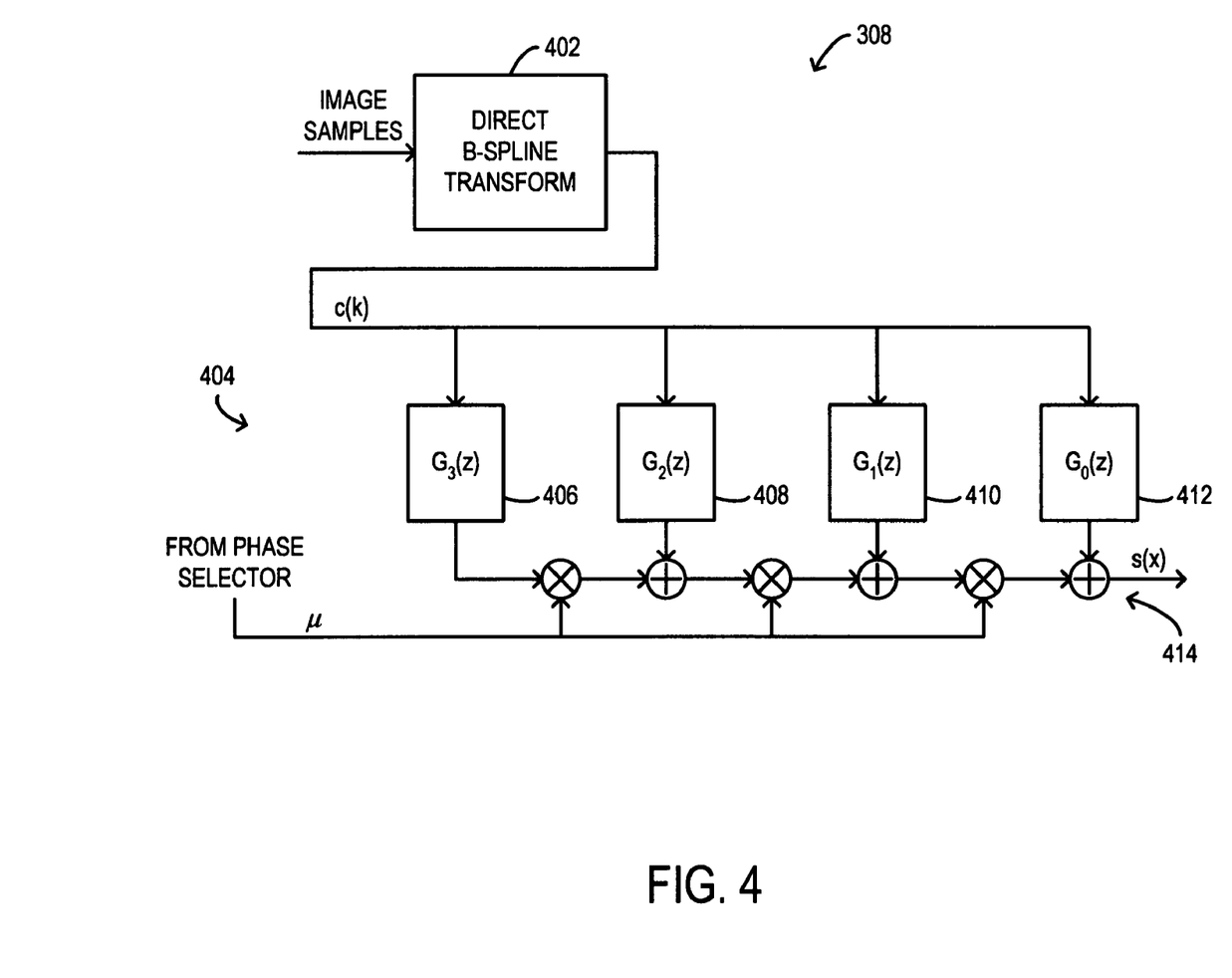
FIG. 4 illustrates some details of an extended Farrow structure included in the circuitry of FIG. 3.

FIG. 4 illustrates some details of the B-spline re-scaler 308. The B-spline re-scaler 308 includes a direct B-spline transform block 402. The B-spline transform block 402 receives a subset of the current line of input samples and computes B-spline transform coefficients needed for interpolation. The coefficients allow B-spline functions to be used to reconstruct a continuous signal from the discrete input samples. For example, a cubic (third order) B-spline analysis may be performed by the block 402. The resulting coefficients c(k) may be used in the extended Farrow structure described below to provide the output sample values required for the given re-sizing ratio, as reflected by the current phase offset.

The B-spline re-scaler 308 also includes an extended Farrow structure formed of a filter bank 404 and an array 414 of multipliers and adders. The filter bank 404 is coupled to receive the transform coefficients produced by the direct B-spline transform block 402. In the case of a third order transform, the filter bank 404 may be constituted by filters 406 ($G_0(z)$), 408 ($G_1(z)$), 410 ($G_2(z)$) and 412 ($G_3(z)$). Suitable filter characteristics for these filters will be set forth below.

The array 414 of multipliers and adders is coupled to the output of the filter bank 404. The array 414 is also coupled to the phase offset determination block 306 (FIG. 3, not shown in FIG. 4) to receive the current phase offset $\mu$ to be applied to the signals output from the filter bank 404.

The extended Farrow structure, among other functions, provides conversion of the coefficients back to the time domain.

The direct B-spline transform block 402 may operate to compute transform coefficients from a set of sample values $s(k), k=1, \ldots, K$, from the following recursive filter equations:

$$c^+(k)=s(k)+b_1{}^*c^+(k-1), \text{ for } k=1,\ldots,K-1 \qquad (\text{Eq. 1})$$

$$c^-(k)=b_1{}^*(c^-(k+1)-c^+(k)), \text{ for } k=K-2,\ldots,0 \qquad (\text{Eq. 2})$$

$$c(k)=6{}^*c^-(k), \qquad (\text{Eq. 3})$$

with boundary conditions:

$$c^+(0) = \sum_{k=0}^{k_0} s(k)b_1^k \qquad (\text{Eq. 4})$$

and $$c^-(K-1)=(b_1/(1-b_1{}^2))(c^+(K-1)+(b_1{}^*c^+(K-2))) \qquad (\text{Eq. 5}),$$

where:
$b_1=\text{sqrt}(3)-2$;
$k_0>(\log \epsilon)/(\log|b_1|)$; and
$\epsilon$ is the required level of precision.

It is believed that image quality is not significantly improved for $k_0>10$.

The blocks of input samples utilized for Equations 1 and 2 may number, e.g. 20 or 30 samples.

The transform performed by the direct B-spline transform block 402 takes a number of input samples that is equal to the number of coefficients to be calculated. Generally, the coefficients $c(0)$, $c(K-1)$ and $c(K)$ are discarded because satisfactory convergence may not be obtained for these coefficients. The coefficients $c(1)$ to $c(K-2)$ are then output to the array 414 to calculate the phase value. In some embodiments, four coefficients are used to calculate a single phase value, except that five coefficients may be used in these embodiments when the current phase offset is zero.

Figure 5:
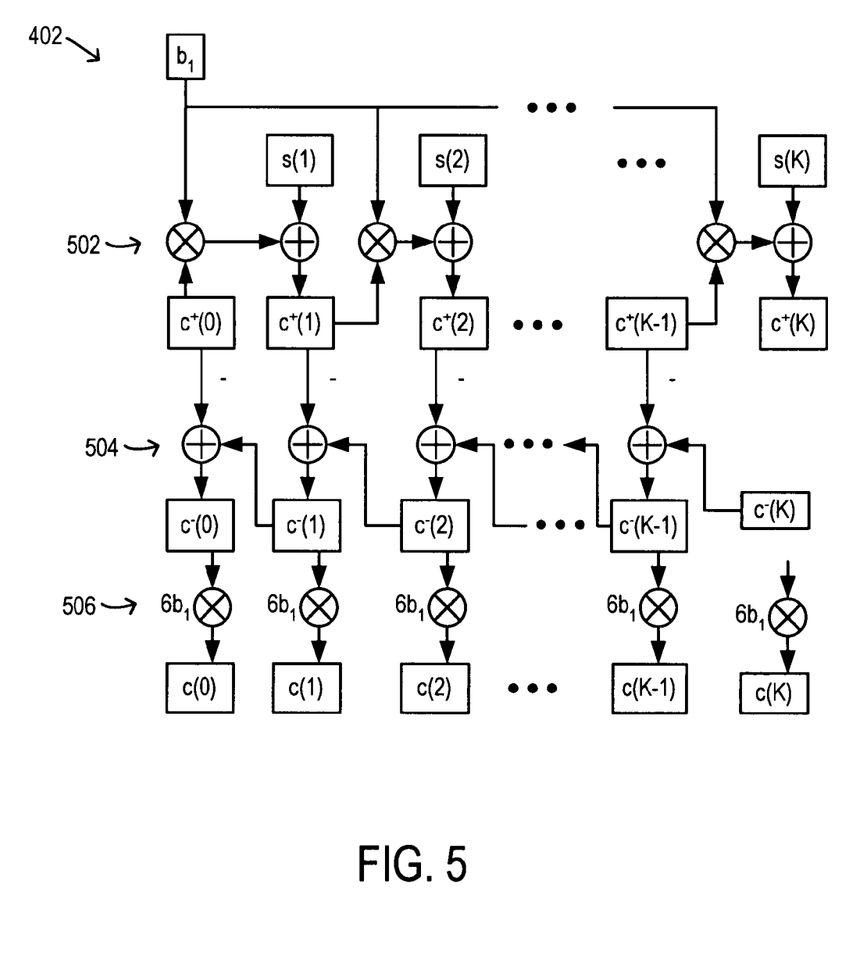
FIG. 5 illustrates some details of a direct B-spline transform block that is part of the extended Farrow structure of FIG. 4.

FIG. 5 illustrates some details of the direct B-spline transform block 402. In particular, FIG. 5 shows an architecture (e.g., implemented in logic circuitry) to calculate the transform coefficients $c(k)$ based on a set of input samples $s(k)$ in accordance with Equations (1)-(3). In particular, the transform block 402 includes an array 502 of adders and multipliers to calculate intermediate coefficients $c^+(k)$ from the input samples $s(k)$. Further, the transform block 402 includes an array 504 of adders to calculate intermediate coefficients $c^-(k)$ from intermediate coefficients $c^+(k)$. In addition, the transform block 402 includes an array 506 of multipliers to calculate the output coefficients $c(k)$ from the intermediate coefficients $c^-(k)$.

Referring again to FIG. 4, the filters making up the filter bank 404 may be all-zero systems with the following transfer functions:

$$G_0(z)=(1+4z^{-1}+z^{-2})/6$$

$$G_1(z)=(-3+3z^{-2})/6$$

$$G_2(z)=(3-6z^{-1}+3z^{-2})/6$$

$$G_3(z)=(-1+3z^{-1}-3z^{-2}+1z^{-3})/6$$

Figure 6:
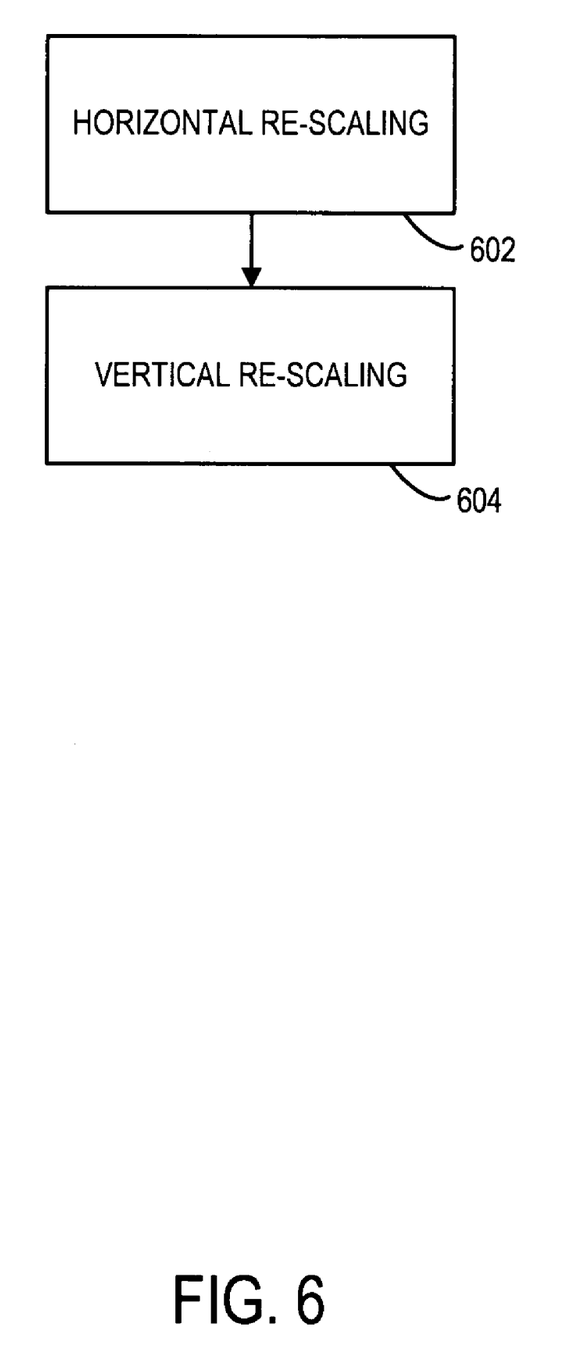
FIG. 6 is a high level flow chart that illustrates a process performed in the re-scaling circuit of FIG. 2.

FIG. 6 is a high level flow chart that illustrates a process performed in the re-scaling circuit 108. At 602 in FIG. 6, the horizontal rows of pixels are re-scaled one after the other by the re-scaling circuit 108. Thereafter, at 604, the columns of pixels of the horizontally re-scaled image are re-scaled.

Figure 7:
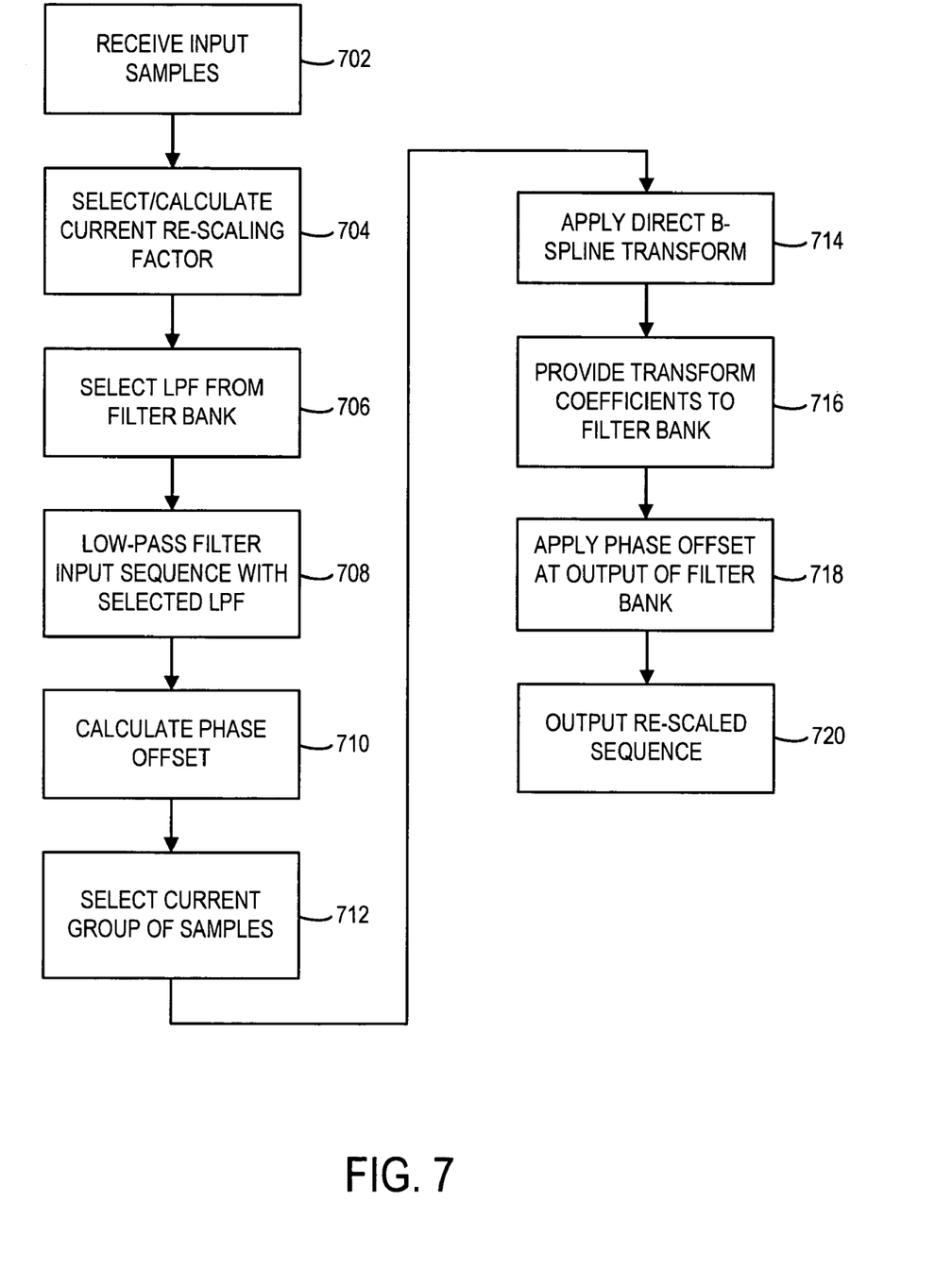
FIG. 7 is a flow chart that illustrates a one-dimensional re-scaling process performed as part of the process of FIG. 6.

FIG. 7 is a flow chart that illustrates a one-dimensional re-scaling process performed by the re-scaling circuit 108 as part of the process of FIG. 6. For example, the process of FIG. 7 may be applied to re-scale a row or column of pixels.

At 702 in FIG. 7, a sequence of input samples (e.g., representing a row of pixels in the image to be re-scaled) is received by the re-scaling circuit 108. At 704, the re-scaling factor calculating block 202 calculates or selects the current re-scaling factor to be applied in view of the current location along the row of pixels. (It should be understood that calculating a re-scaling factor is one way of selecting the re-scaling factor.) The selected re-scaling factor is applicable to at least a portion of the row of pixels (i.e, to at least one pixel; alternatively the selected re-scaling factor is applicable to at least a portion of a current column of pixels, assuming that vertical rather than horizontal re-scaling is currently being performed).

At 706, the re-scaling factor calculating block 202 selects one of the low pass filters from the filter bank 204, based on the currently selected re-scaling factor. The low pass filter that is selected may be the one having the widest passband which is sufficiently narrow to substantially prevent aliasing that might otherwise result from the effective reduction in sampling rate to be performed by the re-scaler 206 in the case of downscaling (re-scaling factor<1). Alternatively, if the selected re-scaling factor is greater than one (i.e., upscaling is being performed) the filter bank 204 may be by-passed by the input sample sequence. At 708, if the filter bank 204 is not by-passed, the input sample sequence is low-pass filtered by the selected filter from the filter bank 204.

At 710, the phase offset determination block 306 (FIG. 3) determines the phase offset for the current pixel to be generated. This determination is based on the re-scaling factor selected by the re-scaling factor calculating block 202. The first pixel of a row may be selected at a zero phase offset and may be the same as the first input pixel of the row or column. The phase offset for the next pixel may be the non-integer part of the inverse of the re-scaling factor, less 0.5. Thereafter, for each succeeding pixel, the phase offset determination block 306 may calculate a cumulative total phase based on the current value of the re-scaling factor (which may be changed from pixel to pixel). That is, with each pixel after the first, the cumulative total phase may be incremented by the inverse of the current value of the re-scaling factor. Then the current phase offset $\mu$ may be taken as the non-integer part of the cumulative phase, less 0.5.

At 712, a group of samples from the sequence of input samples is selected (after low-pass filtering, if required, by the selected low pass filter of the filter bank 204) to be the input for the direct B-spline transform block 402 (FIG. 4).

At 714, the transform block 402 applies a direct B-spline transform (e.g., a cubic B-spline transform) to the group of samples selected at 712 to generate transform coefficients. As noted above, the transform may be performed in accordance with the recursive filter equations listed above as Equations (1)-(3).

At 716, a group of the resulting transform coefficients are provided from the transform block 402 to the filter bank 404. When $0<\mu<0.5$ is the case, the coefficients c(k−1), c(k), c(k+1) and c(k+2) are provided to the filter bank 404; when $-0.5\leq\mu<0$ is the case, the coefficients c(k−2), c(k−1), c(k) and c(k+1) are provided to the filter bank 404; when $\mu=0$, the coefficients c(k−2), c(k−1), c(k), c(k+1) and c(k+2) are provided to the filter bank 404. In each of these cases, k is the current index value, and is equal to the integer part of the cumulative phase.

At 718, the phase offset $\mu$ is applied at the output of the filter bank 404, as indicated in FIG. 4, by the array 414 of adders and multipliers to obtain the output pixel value.

As indicated at 720, the process of FIG. 7 is repeated with respect to each output pixel position (each corresponding to a respective value of the cumulative phase) to output a sequence of re-scaled output sample values.

At the ends of each row or column, fill-in pixel values must be supplied for the filter operation. This may be done for example by zero-padding, replicating the first (or last) pixel value, or by mirroring the pixel values at the end or beginning of the row or column.

The re-scaling factor may be changed on a pixel-by-pixel basis along the row or column of pixels to support anamorphic re-scaling.

Figure 8:
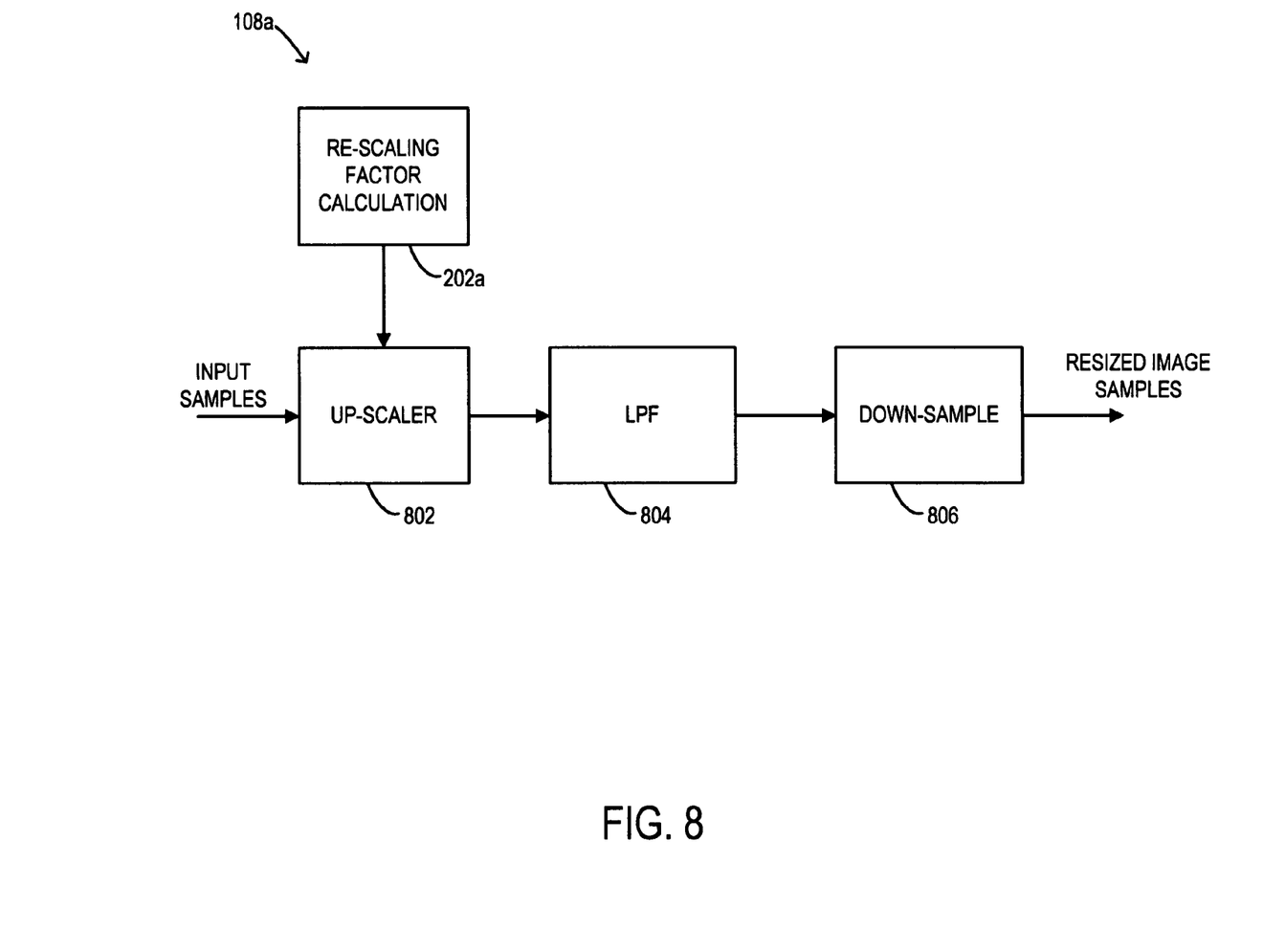
FIG. 8 is a block diagram of another embodiment of the image re-scaling circuit.

FIG. 8 is a block diagram that illustrates another embodiment of the re-scaling circuit. As in the previously described embodiment, a one-dimensional re-scaler is shown, which may be applied first to horizontal line re-scaling and thereafter to vertical column re-scaling (or vice versa).

The re-scaling circuit 108a shown in FIG. 8 includes a re-scaling factor calculating block 202a to calculate or select a re-scaling factor to be applied by the re-scaling circuit. As before, the re-scaling factor calculating block 202a may support anamorphic re-scaling by changing (e.g., recalculating) the re-scaling factor along a row or column of pixels being processed by the re-scaling circuit.

The re-scaling circuit 108a further includes an up-scaling block 802 which is coupled to receive the currently effective re-scaling factor from the re-scaling factor calculating circuit 202a. The up-scaling block 802 performs an up-scaling operation, utilizing direct B-spline analysis and phase interpolation, as described below, with respect to an input sequence of samples. The up-scaling block 802 may have the same structure shown in FIGS. 3-5, the only difference being that the re-scaling factor supplied to the up-scaling block 802 is always greater than 1.

The re-scaling circuit 108a also includes a low pass filter 804 which is coupled downstream from the up-scaling block 802 to low-pass filter the up-scaled sample sequence output from the up-scaling block 802. Still further, the re-scaling circuit 108a includes a fixed down-sampling block 806 which is coupled downstream from the LPF 804 to down-sample the low-pass-filtered sample sequence output from the LPF 804 by a factor of N. The LPF 804 may have a cut-off frequency of $\pi/N$ to provide satisfactory anti-aliasing filtering.

Figure 9:
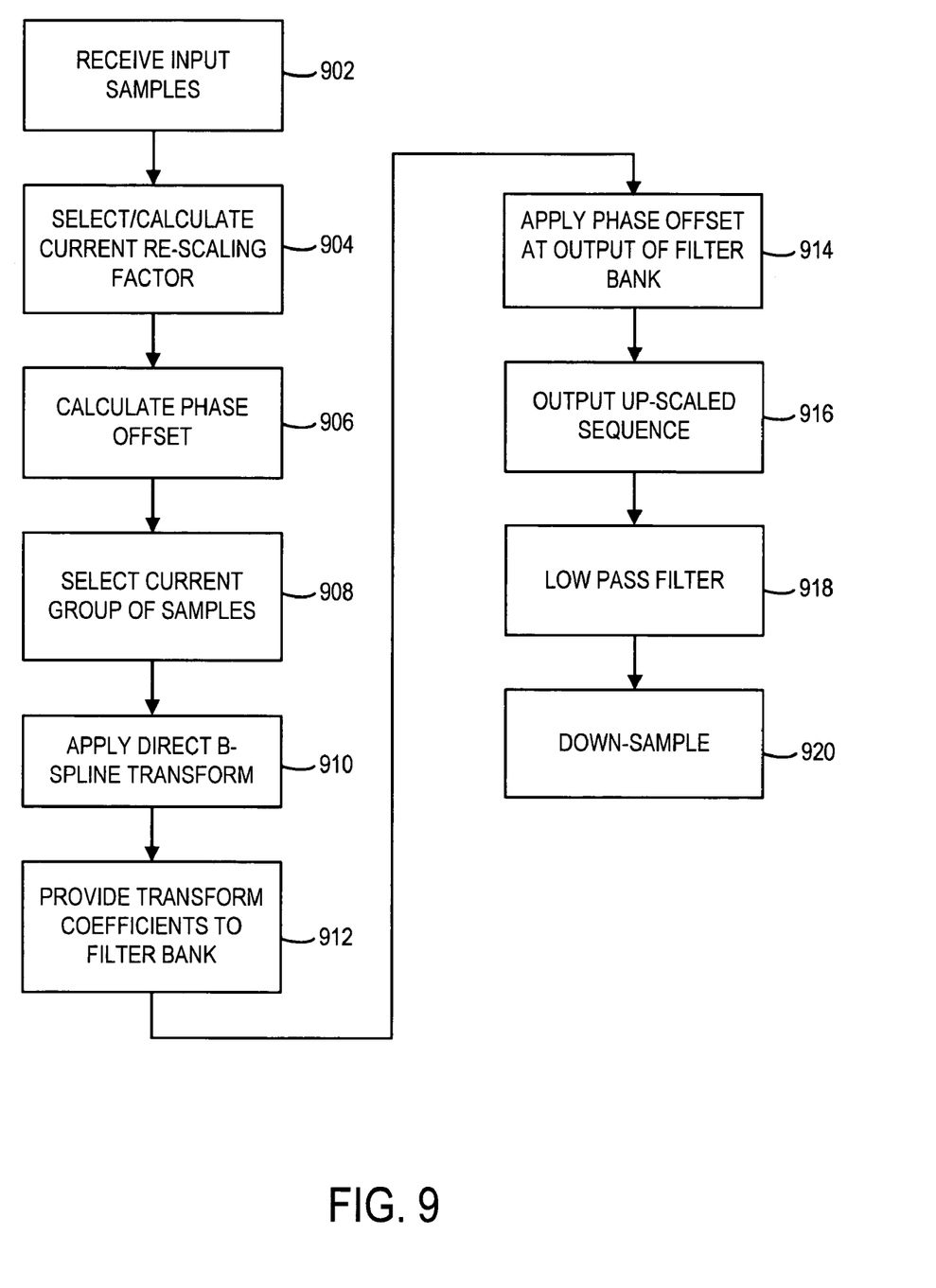
FIG. 9 is a flow chart that illustrates a one-dimensional re-scaling process performed in the image re-scaling circuit of FIG. 8.

FIG. 9 is a flow chart that illustrates a one-dimensional re-scaling process performed by the re-scaling circuit 108a. For example, the process of FIG. 9 may be applied to re-scale a row or column of pixels.

At 902 in FIG. 9, a sequence of input samples (e.g., representing a row of pixels in the image to be re-scaled) is received by the re-scaling circuit 108a. At 904, the re-scaling factor calculating block 202a calculates or selects the current re-scaling factor to be applied in view of the current location along the row of pixels. This currently desired re-scaling factor may be greater than one (for up-scaling) or less than one (for down-scaling). However, in view of the down-sampling to be provided downstream by the down-sampling block 806, the re-scaling factor supplied by the re-scaling factor calculating block 202a to the up-scaler block 802 is N times the desired re-scaling factor. N may be selected such that the product of N and the smallest permissible re-scaling factor is greater than one.

At 906, the phase-offset determination block 306 (FIG. 3) determines the phase offset for the current pixel to be generated. The determination is based on the re-scaling factor supplied to the up-scaler block 802 by the re-scaling factor calculating block 202a. The first pixel of a row or column may be selected at a zero phase offset and may be the same as the first input pixel of the row or column. The phase offset for the next pixel may be the inverse of the re-scaling factor supplied by the re-scaling factor calculating block (which re-scaling factor is guaranteed in this embodiment to be greater than one), less 0.5. Thereafter, for each succeeding pixel, the phase offset determination block 306 may calculate a cumulative total phase based on the current value of the re-scaling factor supplied by the re-scaling factor determination circuit 202a (which may be changed from pixel to pixel). That is, with each output pixel after the first, the cumulative total phase may be incremented by the inverse of the value of the re-scaling factor currently provided to the up-scaler block 802. Then the current phase offset μ may be taken as the non-integer part of the cumulative phase, less 0.5.

At 908, a group of samples from the sequence of input samples is selected to be the input for the direct B-spline transform block 402 (FIG. 4).

At 910, the transform block 402 applies a direct B-spline transform to the group of samples selected at 908 to generate transform coefficients. The transform may be performed in the same manner described above, e.g., with respect to 714 in FIG. 7.

At 912, a group of the resulting transform coefficients are provided from the transform block 402 to the filter bank 404. The transform coefficients to be provided may be selected as indicated above with respect to 716 in FIG. 7. At 914, the phase offset μ is applied at the output of the filter bank 404, as indicated by FIG. 4, by the array 414 of adders and multipliers, to obtain an output pixel value from the up-scaler block 802.

As indicated at 916, the above operations are repeated for each output pixel position to output a sequence of up-scaled output sample values.

At 918, the sequence of samples output from the up-scaler block 802 is low-pass filtered by the LPF 804. At 920, the low-pass-filtered sequence of samples is down-sampled by a factor of N by the down-sampling block 806. That is, every Nth sample from the sequence received by the down-sampling block 806 is selected to be output from the down-sampling block 806 and all other samples are discarded. The resulting output sequence represents the line or column of pixels after re-scaling in accordance with the desired re-scaling factor selected/calculated (and possibly changed along the row or column) by the re-scaling factor calculating circuit 202a.

Figure 10:
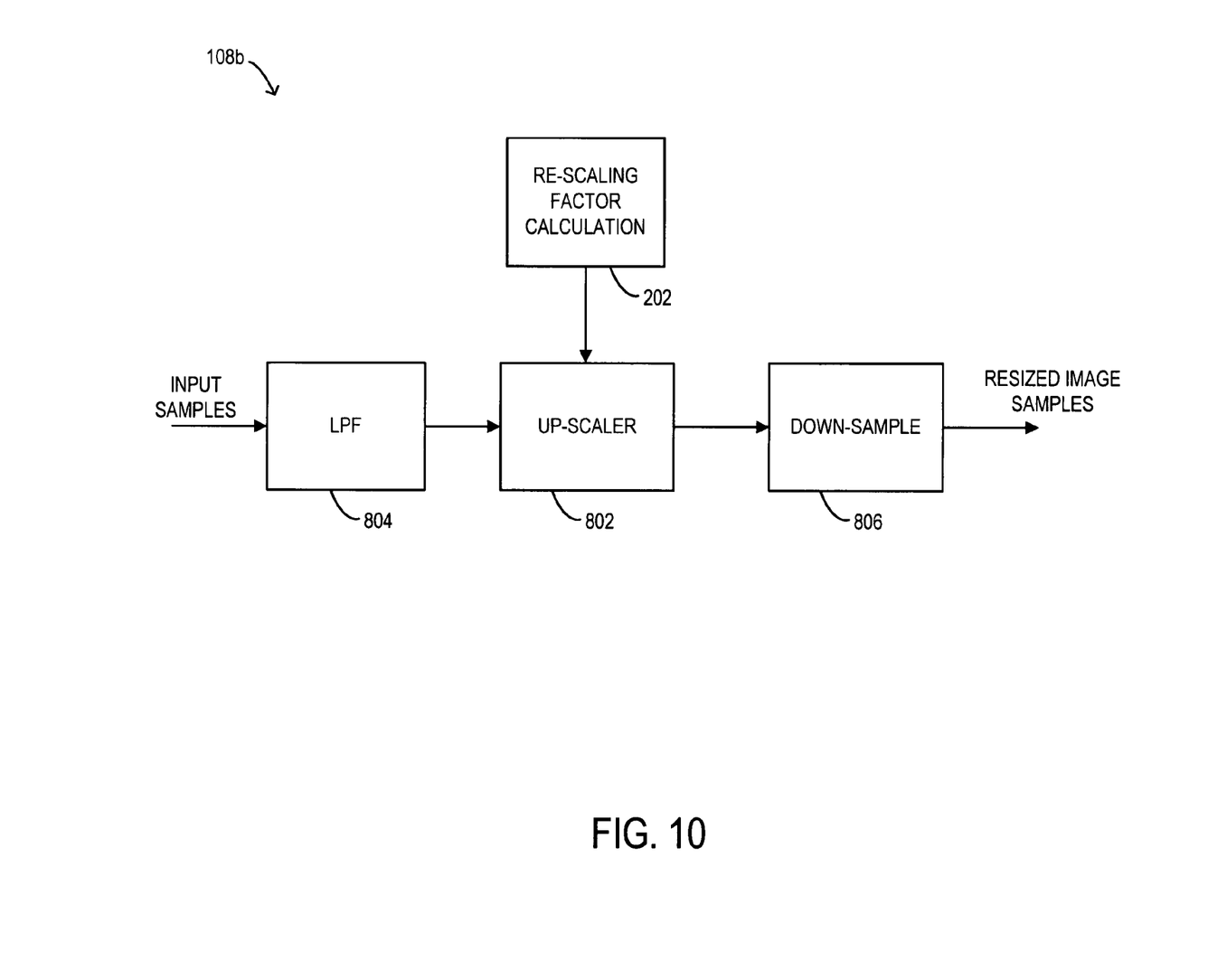
FIG. 10 is a block diagram of still another embodiment of the image re-scaling circuit.

FIG. 10 is a block diagram that illustrates still another embodiment of the re-scaling circuit. As in previously described embodiments, a one-dimensional re-scaler is shown, which may be applied first to horizontal line re-scaling and thereafter to vertical column re-scaling (or vice versa).

The re-scaling circuit 108b shown in FIG. 10 includes the same major components as the re-scaling circuit 108a of FIG. 8, but with the LPF 804 positioned upstream from the up-scaler 802 rather than downstream as in FIG. 8.

Figure 11:
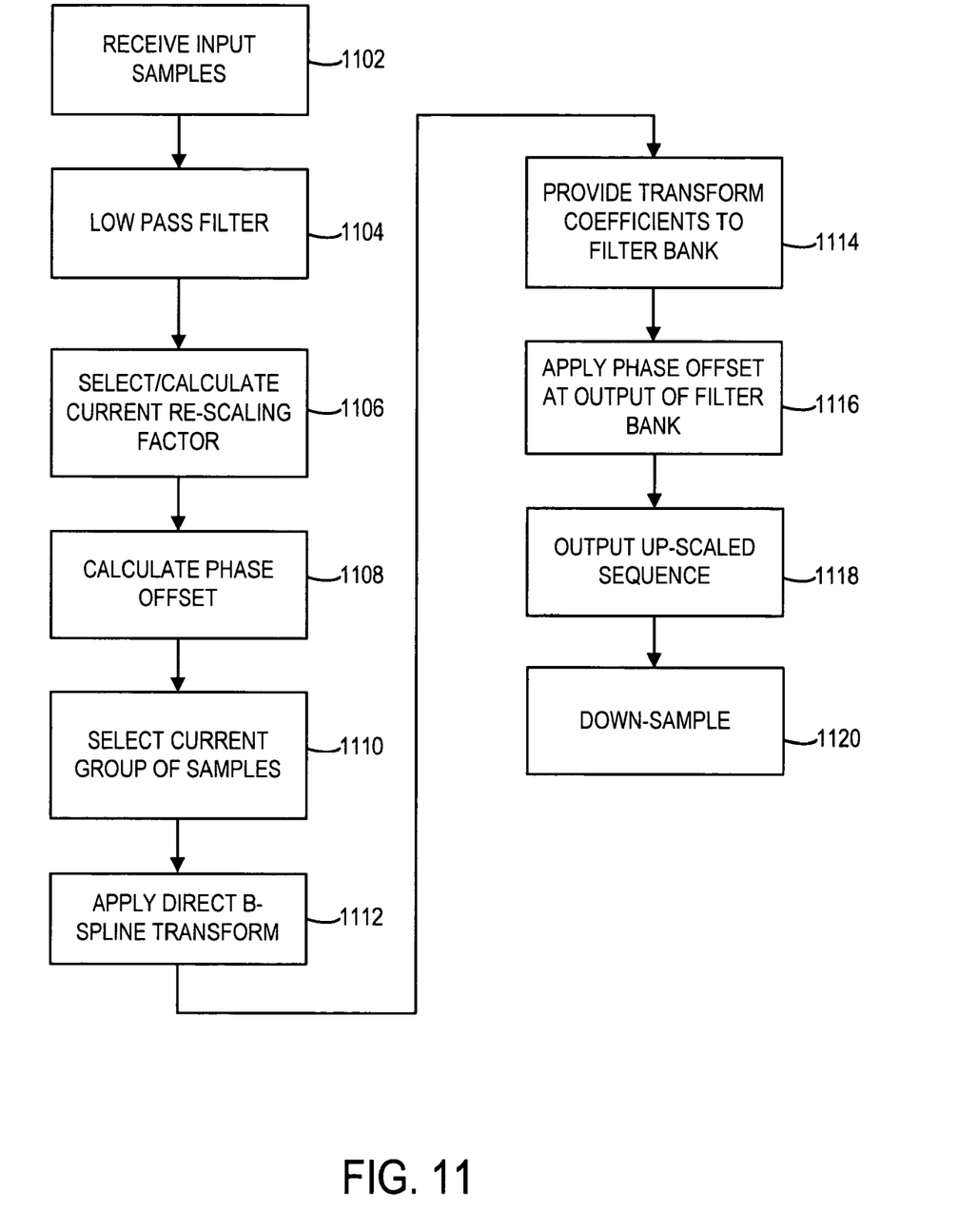
FIG. 11 is a flow chart that illustrates a one-dimensional re-scaling process performed in the image re-scaling circuit of FIG. 10.

FIG. 11 is a flow chart that illustrates a one-dimensional re-scaling process performed by the re-scaling circuit 108b.

For example, the process of FIG. 11 may be applied to re-scale a row or column of pixels.

At 1102 in FIG. 11, a sequence of input samples (e.g., representing a row of pixels in the image to be re-scaled) is received by the re-scaling circuit 108b. At 1104, the sequence of input samples is low-pass filtered by the LPF 804. At 1106, the re-scaling factor calculating block 202a calculates or selects the current re-scaling factor to be applied in view of the current location along the row of pixels. This currently desired re-scaling factor may be greater than one (for up-scaling) or less than one (for down-scaling). However, in view of the down-sampling to be provided downstream by the down-sampling block 806, the re-scaling factor supplied by the re-scaling factor calculating block 202a to the up-scaler block 802 is N times the desired re-scaling factor. N may be selected such that the product of N and the smallest permissible re-scaling factor is greater than one.

At 1108, the phase-offset determination block 306 (FIG. 3) determines the phase offset for the current pixel to be generated. The determination is based on the re-scaling factor supplied to the up-scaler block 802 by the re-scaling factor calculating block 202a. The first pixel of a row or column may be selected at a zero phase offset and may be the same as the first input pixel of the row or column. The phase offset for the next pixel may be the inverse of the re-scaling factor supplied by the re-scaling factor calculating block (which re-scaling factor is guaranteed in this embodiment to be greater than one), less 0.5. Thereafter, for each succeeding pixel, the phase offset determination block 306 may calculate a cumulative total phase based on the current value of the re-scaling factor supplied by the re-scaling factor determination circuit 202a (which may be changed from pixel to pixel). That is, with each pixel after the first, the cumulative total phase may be incremented by the inverse of the value of the re-scaling factor currently provided to the up-scaler block 802. Then the current phase offset μ may be taken as the non-integer part of the cumulative phase, less 0.5.

At 1110, a group of samples from the input sequence, after low pass filtering at LPF 804, is selected to be the input for the direct B-spline transform block 402 (FIG. 4).

At 1112, the transform block 402 applies a direct B-spline transform to the group of samples selected at 1110 to generate transform coefficients. The transform may be performed in the same manner described above, e.g., with respect to 714 in FIG. 7.

At 1114, a group of the resulting transform coefficients are provided from the transform block 402 to the filter bank 404. The transform coefficients to be provided may be selected as indicated above with respect to 716 in FIG. 7. At 1116, the phase offset μ is applied at the output of the filter bank 404, as indicated by FIG. 4, by the array 414 of adders and multipliers, to obtain an output pixel value from the up-scaler block 802.

As indicated at 1118, the above operations are repeated for each output pixel position to output a sequence of up-scaled output sample values. At 1120, the up-scaled sample sequence is down-sampled by a factor of N by the down-sampling block 806. That is, every Nth sample from the sequence received by the down-sampling block 806 is selected to be output from the down-sampling block 806 and all other samples are discarded. The resulting output sequence represents the line or column of pixels after re-scaling in accordance with the desired re-scaling factor selected/calculated (and possibly changed along the row or column) by the re-scaling factor calculating circuit 202a.

The order in which process stages are indicated in the embodiments described above does not imply a fixed order of performing the process stages; rather, the process stages may be performed in any order that is practicable.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
   receiving a sequence of input samples that represents a row of pixels in an image;
   selecting a re-scaling factor for at least a portion of said row of pixels;
   determining a phase offset based on said selected re-scaling factor;
   applying a direct B-spline transform to a group of said samples to generate transform coefficients;
   providing the transform coefficients as an input to a filter bank; and
   applying said phase offset at an output of said filter bank to generate a sequence of output samples.

2. The method of claim 1, wherein said re-scaling factor is changed along said row of pixels.

3. The method of claim 1, wherein the direct B-spline transform is a cubic B-spline transform.

4. The method of claim 1, further comprising:
   providing a bank of low pass filters;
   selecting a filter from said bank of low pass filters based on the selected re-scaling factor; and
   low-pass filtering said sequence of input samples with the selected filter from said bank of low pass filters.

5. The method of claim 1, further comprising:
   low-pass filtering said sequence of output samples; and
   down-sampling said low-pass-filtered sequence of output samples.

6. The method of claim 1, further comprising:
   low-pass filtering said sequence of input samples before applying the direct B-spline transform thereto; and
   down-sampling said sequence of output samples.

7. A system comprising:
   a transform block to receive a sequence of input samples and to apply a direct B-spline transform to a group of said samples to generate transform coefficients, said sequence of input samples representing a row of pixels in an image;
   a filter bank coupled to the transform block to receive the transform coefficients;
   a re-scaling factor block to select a re-scaling factor for at least a portion of said row of pixels;
   a phase-offset determination block coupled to the re-scaling factor block to determine a phase offset based on the re-scaling factor selected by the re-scaling factor block; and
   an array of adders and multipliers coupled to an output of said filter bank and also coupled to said phase-offset determination block, said array of adders and multipliers to generate a sequence of output samples by applying said phase offset to signals output from said filter bank.

8. The system of claim 7, wherein the re-scaling factor block is operative to change the re-scaling factor along said row of pixels.

9. The system of claim 7, wherein the direct B-spline transform is a cubic B-spline transform.

10. The system of claim 7, further comprising:
    a bank of low pass filters coupled upstream from said transform block, said bank of low pass filters also coupled to said re-scaling factor block, said re-scaling factor block operative to select a filter from said bank of low pass filters, said selected low pass filter operative to low-pass filter said sequence of input samples.

11. The system of claim 7, further comprising:
    a low pass filter coupled downstream from the array of adders and multipliers to low-pass filter said sequence of output samples; and
    a down-sample block coupled downstream from the low pass filter to down-sample said low-pass-filtered sequence of output samples.

12. The system of claim 7, further comprising:
    a low pass filter coupled upstream from said transform block to low-pass filter said sequence of input samples; and
    a down-sample block coupled downstream from said array of adders and multipliers to down-sample said sequence of output samples.

13. The system of claim 7, wherein the transform block, the filter bank, the re-scaling factor block, the phase-offset determination block and the array of adders and multipliers are included in a video-processing integrated circuit (IC), the system further comprising a graphics memory unit in communication with the video-processing IC.

14. A method comprising:
    selecting a re-scaling factor for at least a portion of an image;
    determining a phase offset based on said selected re-scaling factor;
    applying a direct B-spline transform to a group of samples that represent said portion of said image, said direct B-spline transform producing transform coefficients;
    providing the transform coefficients as an input to a filter bank; and
    applying said phase offset at an output of said filter bank to generate a sequence of output samples.

15. The method of claim 14, further comprising:
    varying said re-scaling factor from one portion of said image to another portion of said image.

16. The method of claim 14, wherein the direct B-spline transform is a cubic B-spline transform.

17. The method of claim 14, further comprising:
    providing a bank of low pass filters;
    selecting a filter from said bank of low pass filters based on the selected re-scaling factor; and
    low-pass filtering a sequence of input samples with the selected filter from said bank of low pass filters, said sequence of input samples representing said image.

18. The method of claim 14, further comprising:
    low-pass filtering said sequence of output samples; and
    down-sampling said low-pass-filtered sequence of output samples.

19. The method of claim 14, further comprising:
    down-sampling said sequence of output samples.

* * * * *